(12) United States Patent
Sigl et al.

(10) Patent No.: US 9,169,912 B2
(45) Date of Patent: Oct. 27, 2015

(54) DRIVE DEVICE FOR THE ROAD WHEELS OF A VEHICLE

(71) Applicants: Horst Sigl, Passau (DE); Paul Lenz, Waldkirchen (DE); Peter Haselberger, Mauth (DE); Rudolf Neumüller, Buechlberg (DE); Klaus Alesch, Untergriesbach (DE); Alexander Enderl, Vilshofen (DE); Daniel Dudek, Salzweg (DE)

(72) Inventors: Horst Sigl, Passau (DE); Paul Lenz, Waldkirchen (DE); Peter Haselberger, Mauth (DE); Rudolf Neumüller, Buechlberg (DE); Klaus Alesch, Untergriesbach (DE); Alexander Enderl, Vilshofen (DE); Daniel Dudek, Salzweg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/161,955

(22) Filed: Jan. 23, 2014

(65) Prior Publication Data
US 2014/0206493 A1 Jul. 24, 2014

(30) Foreign Application Priority Data
Jan. 24, 2013 (DE) .................. 10 2013 201 092

(51) Int. Cl.
*F16H 48/38* (2012.01)
*F16H 48/42* (2012.01)
*B60K 17/04* (2006.01)

(52) U.S. Cl.
CPC ............. *F16H 48/38* (2013.01); *F16H 48/42* (2013.01); *B60K 17/046* (2013.01); *F16H 2048/423* (2013.01)

(58) Field of Classification Search
CPC ........ F16H 48/38; F16H 48/42; B60K 17/046
See application file for complete search history.

(56) References Cited

U.S. PATENT DOCUMENTS

| | | | |
|---|---|---|---|
| 1,023,683 | A | 4/1912 | Royce |
| 1,506,037 | A | 8/1924 | Alden et al. |
| 1,506,365 | A | 8/1924 | Domizi |
| 1,613,566 | A | 1/1927 | Melanowski |
| 2,061,009 | A | 11/1936 | Rothrock |
| 2,118,760 | A | 5/1938 | Ernst |
| 2,270,567 | A | 1/1942 | Slider |
| 2,546,969 | A | 4/1951 | Buckendale |
| 2,659,246 | A | 11/1953 | Norelius |
| 3,006,700 | A | 10/1961 | Hoffmann |
| 3,260,132 | A | 7/1966 | West et al. |
| 4,004,471 | A | 1/1977 | Keske |
| 4,733,578 | A | 3/1988 | Glaze et al. |
| 6,357,927 | B1 | 3/2002 | Myers et al. |
| 6,554,733 | B2 | 4/2003 | Niebauer |
| 6,695,739 | B2 | 2/2004 | Fett |
| 6,814,683 | B2 | 11/2004 | Krzesicki et al. |
| 7,108,428 | B2 | 9/2006 | Ason et al. |
| 7,722,495 | B1 | 5/2010 | Stanley |

(Continued)

*Primary Examiner* — Jacob S Scott
(74) *Attorney, Agent, or Firm* — Cozen O'Connor

(57) ABSTRACT

A drive device for the road wheels of a vehicle includes a stationary housing in which a rotatably drivable differential housing having an axle differential gear unit is rotatably mounted by differential bearings, at least one driveshaft being rotatably drivable by the differential housing. At least one driving gear wheel is arranged on the at least one driveshaft so as to be fixed with respect to rotation relative to the latter. The at least one driving gear wheel meshingly engage by oppositely directed helical teeth with at least one driven gear wheel for driving road wheels of the vehicle and generating axial forces directed toward the center of the axle differential gear unit. At least one thrust bearing arrangement is supported axially with respect to the at least one driveshaft at a radial supporting surface.

12 Claims, 1 Drawing Sheet

(56) References Cited

U.S. PATENT DOCUMENTS

| | | |
|---|---|---|
| 7,775,929 B2 | 8/2010 | Waksmundzki |
| 8,109,000 B2 | 2/2012 | Zalanca et al. |
| 2002/0031289 A1 | 3/2002 | Kenney, Jr. |
| 2002/0183156 A1 | 12/2002 | Gradu et al. |
| 2009/0019966 A1* | 1/2009 | Valente ............................ 74/650 |
| 2010/0081535 A1* | 4/2010 | Gutsmiedl .................... 475/228 |
| 2010/0151983 A1 | 6/2010 | Ziech et al. |
| 2011/0075960 A1 | 3/2011 | White et al. |
| 2012/0295753 A1 | 11/2012 | Kwon |

* cited by examiner

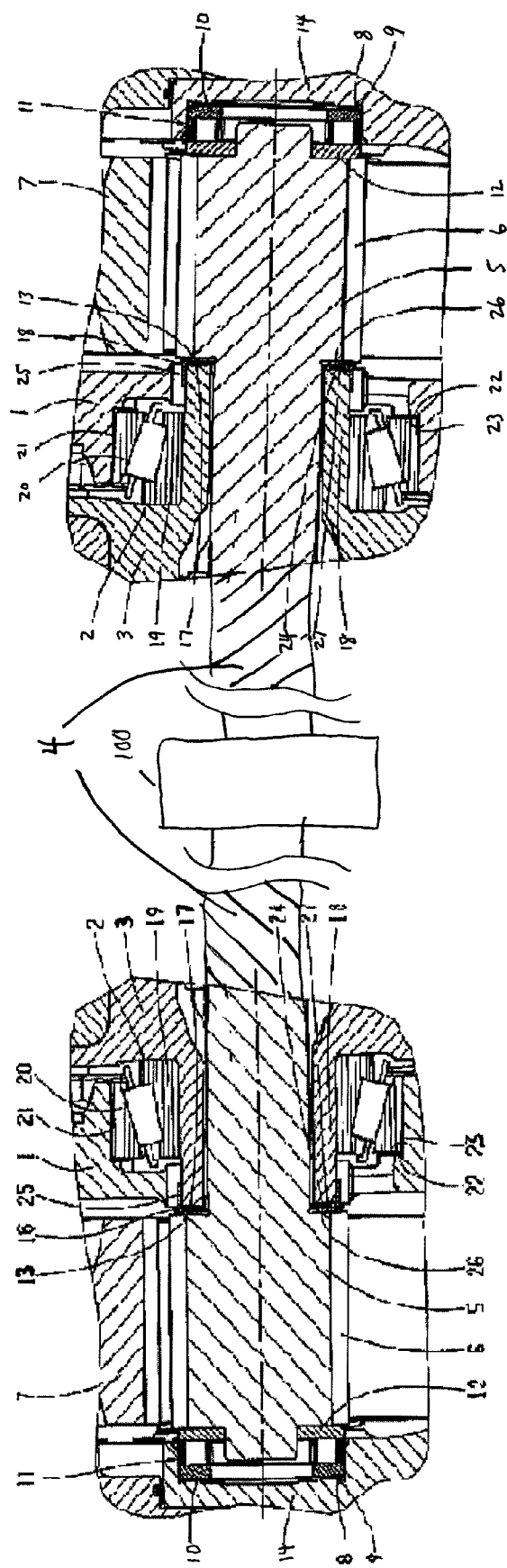

DRIVE DEVICE FOR THE ROAD WHEELS OF A VEHICLE

BACKGROUND OF THE INVENTION

1. Field of the Invention

The invention is directed to a drive device for the road wheels of a vehicle with a stationary housing in which a rotatably drivable differential housing with an axle differential gear unit is rotatably mounted by differential bearings, typically two driveshafts being rotatably drivable by the differential housing, a driving gear wheel being arranged on the two driveshafts in each instance so as to be fixed with respect to rotation relative to the latter. The driving gear wheels meshingly engage by oppositely directed helical teeth with driven gear wheels for driving road wheels of the vehicle and generate axial forces directed toward the center of the axle differential gear unit, with thrust bearing arrangements for supporting these axial forces, these thrust bearing arrangements being in turn supported at a structural component part of the drive device.

2. Description of the Related Art

In a drive device of the type mentioned above, it is known to support the axial forces of the driving gear wheels directed toward the center of the axle differential at parts of the housing that project radially between the driving wheels and the differential housing until closely adjacent to the driveshafts and have an axial guide and a radial supporting surface for the thrust bearing arrangements.

If the helix angle of the helical toothing is to be large so that higher outputs can be transmitted, there will also be an increase in the axial forces generated by the driving gear wheels and directed to the center of the axle differential and which must be supported via the thrust bearing arrangements at the parts of the housing. This requires a larger bearing arrangement and a more stable design of the parts of the housing and, therefore, a larger installation space. However, enlargement in the axial direction is impossible because the installation space is limited by the rims of the road wheels, by the tire clearance for the latter and by the differential bearings.

SUMMARY OF THE INVENTION

Therefore, it is an object of the invention to provide a drive device of the type mentioned above that is constructed in a simple manner and that allows the increased axial forces generated by the driving wheels to be supported without an increased installation space requirement.

This object is met, according to a first aspect of the invention, in that the thrust bearing arrangements are stop disks secured to the differential housing or to a structural component part connected to the differential housing and which, by their radial first sides, axially contact the driving gear wheels and which, by their radial second sides, parallel to their radial first sides, are directly or indirectly supported axially with respect to the driveshafts at radial supporting surfaces of the differential housing or of the structural component part fixedly connected to the differential housing.

In this way, the axial space between the driving gear wheel and differential housing is available in its entirety for the bearing arrangement so that the latter can be larger and, therefore, configured in a more suitable manner for higher axial forces without an increased installation space requirement.

Further, a larger helix angle of the helical toothing of the driving gear wheels benefits noise behavior and reduces gear tooth friction loss.

By securing the stop disks to the differential housing or to a structural component part connected to the differential housing, the stop disks are brought into contact with the driveshafts. Grinding noises brought about in this way are accordingly prevented.

Special connecting elements can be dispensed with when the stop disks are secured by frictional engagement to the differential housing or to the structural component part connected to the differential housing. This also results in a simple construction and in fewer structural component parts.

To this end, in accordance with an aspect of the invention, the stop disks can be secured to the differential housing or to the structural component part connected to the differential housing by an interference fit.

In another aspect, in a simple manner that economizes on component parts, the stop disks can have sleeve projections directed to the differential housing, which enclose by interference fit tubular elongations of the differential housing that are coaxial to the driveshafts and directed to the driving gear wheels.

In another aspect, the stop disks having the sleeve projections are formed inexpensively by stamped sheet metal parts.

The tubular elongation performs a further function in that the stop disks can be directly or indirectly supported by their radial second sides at the radial faces of the tubular elongations, which face the driving gear wheels and form the first supporting surfaces.

For exact axial positioning of the driving gear wheel, in another aspect, a first spacer disk of determined thickness can be arranged between each stop disk and the supporting surface of the differential housing associated with it.

According to another aspect, to achieve concentric positioning of the spacer disks in a simple manner, concentric annular grooves, which open axially toward the stop disks and in which the first spacer disks are inserted, can be formed at the radial faces of the tubular elongations.

In another aspect, the stop disks can be made of sliding bearing material in order to reduce friction between the stop disks and the driving gear wheels.

Friction between the stop disks and the driving gear wheels can likewise be reduced, in another aspect, by the stop disks having recessed oil pockets on their faces facing the driving gear wheels.

When this is done, the oil contained in the oil pockets forming a lubricating film, which sometimes emerges from the oil pockets, is always pressed back again into the oil pockets by the helical toothing and is, at least to a great extent, prevented from escaping.

In order also to achieve an axial positioning of the differential bearing relative to the housing corresponding to the axial positioning by the first spacer disk, in another aspect, each differential bearing can contact a radial second supporting surface of the housing axially via a second spacer disk of determined thickness, such that the first spacer disk and the second spacer disk have the same thickness. Spacer disks of the required thickness are applied depending on the actual proportions.

To pre-load the bearings, the driving gear wheel is loaded axially toward the center of the axle differential gear unit in a simple manner by a first spring element which is supported at the housing.

In a simple construction, the spring element can be a plate spring.

By virtue of the fact that parts of the housing need no longer extend to a point closely adjacent to the driveshaft for receiving and supporting the bearing arrangements, the driveshafts can be formed integrally with driving gear wheels with which they are associated, and the driveshafts formed integrally with the driving gear wheels can be mounted from the differential side so as to facilitate assembly.

Other objects and features of the present invention will become apparent from the following detailed description considered in conjunction with the accompanying drawing. It is to be understood, however, that the drawing is designed solely for purposes of illustration and not as a definition of the limits of the invention, for which reference should be made to the appended claims. It should be further understood that the drawing is not necessarily drawn to scale and that, unless otherwise indicated, it is merely intended to conceptually illustrate the structures and procedures described herein.

BRIEF DESCRIPTION OF THE DRAWING

An exemplary embodiment of the invention is shown in the drawing and is described more fully in the following. In the drawing:

The FIGURE shows a section of a drive device for the road wheels of a vehicle.

DETAILED DESCRIPTION OF THE PRESENTLY PREFERRED EMBODIMENTS

As seen in the FIGURE, a rotatably drivable differential housing 3 of an axle differential gear unit 100 is rotatably mounted in a housing 1 by two differential bearings 2.

Two driveshafts 4 are rotatably drivable in a diametrically opposed manner by the axle differential gear unit. The following detailed description will generally be directed to the section illustrated at the left hand side of the FIGURE, which shows the area of one of these driveshafts 4. As will be understood, the same components also appear in the section illustrated at the right of the FIGURE.

At its end remote of the axle differential gear unit, the driveshaft 4 is formed integral with a driving gear wheel 5 having a helical toothing 6. The driving gear wheel 5 is in meshing engagement with a driven wheel 7 such that a road wheel (not shown) of a vehicle can be driven in rotation.

The housing 1 encloses the end of the driveshaft 4 having the driving gear wheel 5 by a cover 14. Supported on the base of a coaxial recess 8 of the cover 14 of the housing 1 is a plate spring 9, which pre-loads the driving gear wheel 5 and the driveshaft 4 in direction of the differential housing 3 via a running disk 10 and an axial cylindrical rolling bearing 11 and a shaft disk 12.

The driving gear wheel 5 axially contacts a radial first side 26 of a stop disk 13, which is supported in turn by its radial second side 27 via a spacer disk 16 at an annular radial first supporting surface 17 of a tubular elongation of the differential housing 3.

The first spacer disk 16 is inserted into a concentric axial annular groove 24, which is formed at the radial face of the tubular elongation 18, and which has a depth less than the thickness of the first spacer disk 16. The base of the annular groove 24 forms the first supporting surface 17.

The stop disk 13, made of a sliding bearing material and stamped from sheet metal, has at its radially outer circumference a coaxial sleeve projection 25, which encloses by an interference fit the tubular elongation 18 of the differential housing 3, which tubular elongation 18 is coaxial to the driveshaft 4 and directed to the driving gear wheel 5.

The inner ring 19 of the one differential bearing 2 formed as a tapered rolling bearing is arranged on the radially circumferential lateral surface of the tubular elongation 18. The inner ring 19 contacts the differential housing 3 axially.

The outer ring 20 of the differential bearing 2 is inserted into a blind hole 21 in the housing 1 and is supported by its side remote of the differential housing 3 axially via a second spacer disk 23 at the base 22 thereof, this base 22 forming a second supporting surface.

In the exemplary embodiment, the two spacer disks 16 and 23 have the same thickness.

When the driveshaft 4 is driven in rotation, axial forces directed to the center of the axle differential gear unit are generated by the driving gear wheel 5, due to its helical toothing 6. These axial forces are supported at the annular radial first supporting surface 17 of the tubular elongation 18 of the differential housing 3 by the stop disk 13 and the first spacer disk 16.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A drive device for road wheels of a vehicle, the drive device comprising:
   a stationary housing (1);
   a rotatably drivable differential housing (3) with an axle differential gear unit (100), the rotatably drivable differential housing (3) being rotatably mounted in the stationary housing (1) by differential bearings (2);
   two driveshafts (4) rotatably drivable by the rotatably drivable differential housing (3);
   driving gear wheels (5) each associated with and arranged on one of the driveshafts (4), so as to be fixed with respect to rotation relative to the respective driveshaft (4); and
   driven gear wheels (7), one driving gear wheel (5) meshingly engaging, by oppositely directed helical teeth, with each driven gear wheel (7) to generate axial forces directed toward the axle differential gear unit, and having at least one thrust bearing arrangement configured to support the axial forces,
   wherein the at least one thrust bearing arrangement comprises a stop disk (13) secured to the differential housing (3), the stop disk (13) axially contacting, by its radial first side (26), at least one driving gear wheel (5) and, by its radial second side (27), parallel to its radial first side (26), the stop disk (13) is directly or indirectly supported axially, with respect to the driveshafts (4), at a radial supporting surface (17) of the differential housing (3), and
   wherein the stop disk (13) has a sleeve projection (25) directed to the differential housing (3), the sleeve projection (25) enclosing, by interference fit, a tubular elongation (18) of the differential housing (3) coaxial to the driveshafts (4) and directed to at least one of the driving gear wheels (5).

2. The drive device according to claim 1, wherein the sleeve projection (25) comprises stamped sheet metal parts.

3. The drive device according to claim 2, wherein the stop disk (13) is directly or indirectly supported by its radial second side (27) at a radial face of the tubular elongation (18), wherein the tubular elongation (18) faces the at least one of the driving gear wheels (5) and forms the radial supporting surface (17).

4. The drive device according to claim 3, wherein a first spacer disk (16) of determined thickness is arranged between the stop disk (13) and the radial supporting surface (17) of the differential housing (3) associated with the stop disk (13).

5. The drive device according to claim 4, wherein the tubular elongation (18) comprises concentric annular grooves (24) opening axially toward the stop disk (13) and in which the first spacer disks (16) are inserted are formed at a radial face of the tubular elongation (18).

6. The drive device according to claim 1, wherein the stop disk (13) comprises a sliding bearing material.

7. The drive device according to claim 1, wherein the stop disk (13) has at least one recessed oil pocket on its face facing at least one of the driving gear wheels (5).

8. The drive device according to claim 7, wherein each differential bearing (2) contacts a radial second supporting surface (22) of the stationary housing (1) axially, via a second spacer disk (23) of determined thickness, the first spacer disk (16) and the second spacer disk (23) having the same thickness.

9. The drive device according to claim 1, wherein each driving gear wheel (5) is loaded axially toward the axle differential gear unit by a spring element supported at the stationary housing (1).

10. The drive device according to claim 9, wherein the spring element is a plate spring (9, 24).

11. The drive device according to claim 1, wherein each driveshaft (4) is formed integrally with the driving gear wheel (5) with which it is associated.

12. A drive device for road wheels of a vehicle, the drive device comprising:
a stationary housing (1);
a rotatably drivable differential housing (3) with an axle differential gear unit (100), the rotatably drivable differential housing (3) being rotatably mounted in the stationary housing (1) by differential bearings (2);
two driveshafts (4) rotatably drivable by the rotatably drivable differential housing (3);
driving gear wheels (5) each associated with and arranged on one of the driveshafts (4), so as to be fixed with respect to rotation relative to the respective driveshaft (4); and
driven gear wheels (7), one driving gear wheel (5) meshingly engaging, by oppositely directed helical teeth, with each driven gear wheel (7) to generate axial forces directed toward the axle differential gear unit, and having at least one thrust bearing arrangement configured to support the axial forces,
wherein the at least one thrust bearing arrangement comprises a stop disk (13) secured to the differential housing (3), the stop disk (13) axially contacting, by its radial first side (26), at least one driving gear wheel (5) and, by its radial second side (27), parallel to its radial first side (26), the stop disk (13) is directly or indirectly supported axially, with respect to the driveshafts (4), at a radial supporting surface (17) of the differential housing (3), and
wherein the stop disk (13) is secured to the differential housing (3) by an interference fit.

* * * * *